United States Patent [19]
Bartholomew

[11] Patent Number: 4,885,460
[45] Date of Patent: Dec. 5, 1989

[54] DEVICE TO DETECT FREQUENCY CONVERTED SIGNALS WITH HIGH EFFICIENCY

[75] Inventor: Bruce J. Bartholomew, Poway, Calif.

[73] Assignee: General Dynamics Corporation, Convair Division, San Diego, Calif.

[21] Appl. No.: 185,580

[22] Filed: Apr. 25, 1988

[51] Int. Cl.$^4$ ............................................. H01J 3/14
[52] U.S. Cl. ..................................... 250/216; 307/428
[58] Field of Search .................... 250/216; 307/3, 425, 307/426, 427, 428, 429, 430; 324/77 K

[56] References Cited

U.S. PATENT DOCUMENTS 3,934,154  1/1976  Cook, Jr. ............................ 307/427
4,741,588  5/1988  Nicia et al. .............................. 307/3

Primary Examiner—David C. Nelms
Attorney, Agent, or Firm—John R. Duncan; Frank D. Gilliam

[57] ABSTRACT

The purpose of the invention is to separate and detect a weak frequecy converted signal light beam ($f_s+f_p$) which is in the presence of a much stronger pump light beam ($f_p$) at a slightly different frequency. Such a device is useful in laser radars and laser transmitted communication systems where the information is transmitted as a light beam of frequency $f_s$ but more conveniently selected at another frequency $f_s \pm f_p$. A specific example would be laser communication system using a carbon dioxide laser (10.6 micron wavelength $3 \times 10^{13}$ Hz frequency). In some applications a cooled detector (required for most efficient detection at this frequency) may not be feasible and a frequency conversion detector, operating with uncooled detectors, would be preferred. The device comprises a nonlinear crystal which first receives a properly phased matched pump light beam ($f_p$) and a signal light beam ($f_s$) and produces a third beam ($f_s+f_p$) at a different frequency. The output of the nonlinear crystal passes through a filter which greatly attenuates the beam $f_p$ and passes the beam $f_s+f_p$ with little or no attenuation. The beams leaving the filter are than passed through a prism where the residual beam $f_p$ is separated from the beam $f_s+f_p$ and directed onto a bi-cell. The beam $f_p$ is directed with substantially one half of the beam on one cell and the other half on the other cell of the bicell. With the beam $f_s$ turned off the intensity of the two cells of the bi-cell are balanced and subtracted to produce a minimum output signal. The beam $f_s$ is then again turned on and the change in the output is an indication of the intensity of the beam $f_s+f_p$.

7 Claims, 1 Drawing Sheet

DEVICE TO DETECT FREQUENCY CONVERTED SIGNALS WITH HIGH EFFICIENCY

BACKGROUND OF THE INVENTION

The invention is directed to detection and intensity measuring of low intensity light beam signals and more particularly to the optical and electrical separation of the low intensity light beam signal from a very much stronger pump light beam signal by using a combination of a simple optical and electrical filtering techniques.

U.S. Pat. No. 1,678,653 by inventor Fritz Schroeter teaches filtering radio signals with a high static content by rectifying and converting the static radio signal into two 90° polarized light wave signals and blending together the two signals. The static component is cancelled in this manner and the radio wave signal remaining represents the transmitted radio frequency signal. This resulting radio wave signal is then recorded on a light sensitive medium from which it is converted to a readable message. This patent teaches converting radio signals (electrical) to visual (light wave) signals. There is no attempt to measure the intensity of the resulting light signal.

A large body of literature exists on various methods for frequency conversion one of which envisions the concepts of the present invention. The major problem that has not been overcome by the prior art is how to separate a weak signal light beam combined with a strong pump light beam from the strong pump beam. The present invention overcomes this major problem.

SUMMARY OF THE INVENTION

This invention is directed to separating a strong pump light beam $f_p$ from a weak frequency converted light beam $f_s+f_p$ by means of a simple electro-optical filtering technique. A nonlinear crystal mixes the pump beam $f_p$ and signal beam $f_s$ and generates the frequency converted signal light beam $f_s+f_p$. The output beams propagate to an optical filter that passes $f_s+f_p$ with very little attenuation, and strongly attenuates $f_p$. Beams $f_s+f_p$ and $f_p$ are then directed through a prism which separates $f_s+f_p$ and $f_p$ into two separate beams that are then focused on a bi-cell photodetector. The optics are aligned so that $f_p$ is bifurcated into two substantially equal intensity light beams with each of the bifurcated beams ($\frac{1}{2} f_p$) being directed onto one of the bi-cells and substantially all of the light beam $f_s$ being onto one of the bi-cells. The two bi-cells are balanced electrically in the absence of $f_s+f_p$. With the beams $f_s+f_p$ and $f_p$ applied to the bi-cells the difference in the electrical value of outputs of the bi-cells equals the intensity of the signal $f_s+f_p$ i.e. The intensity of the desired frequency converted beam.

A significant advantage of this invention over other techniques is that the filtering requirements in the optical domain are minimized. The fluctuations in the pump beam, which can hide small converted signals are removed by subtracting the two outputs from the bi-cell. Instead of filtering all of the pump beam in the optical domain, where additional losses in the signal beam occur, part of the filtering job is transferred to the electrical domain where it can be done more efficiently.

Specifically, the present invention comprises a nonlinear crystal, a filter, a prism, a focusing lens, a bi-cell and electrical monitoring means for monitoring the voltage output levels of the bi-cell electrical outputs.

An object of this invention is to provide apparatus and method for separating a weak optic signal from a strong optic pump signal and measuring the level of that weak signal efficiently.

Another object of this invention is to detect a weak optic signal mixed with a strong optic signal of a slightly different frequency without the use of an ultra-narrow or multi-stage optical filter.

Other objects, advantages and novel features of the present invention will become apparent from the following detailed description of the invention when considered in conjunction with the accompanying drawings.

DESCRIPTION OF THE PREFERRED EMBODIMENT

Figure 1:
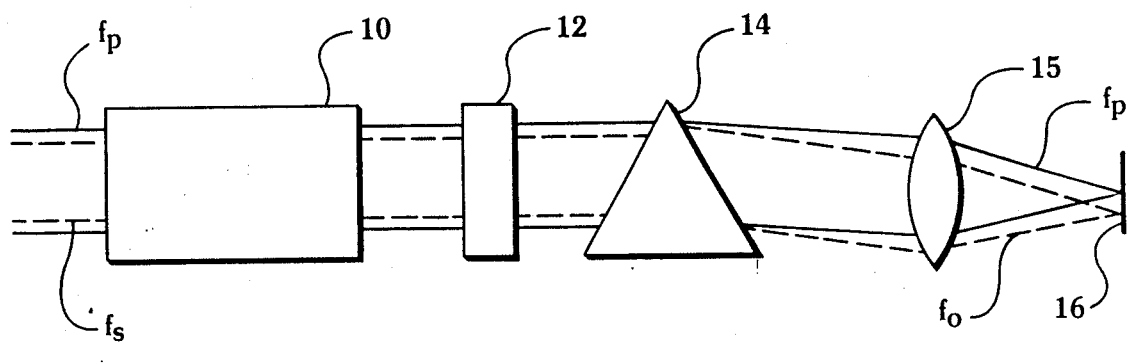
FIG. 1 is a schematic showing of the invention and
FIG. 2 is an end view showing of the bi-cell of FIG. 1.
Figure 2:
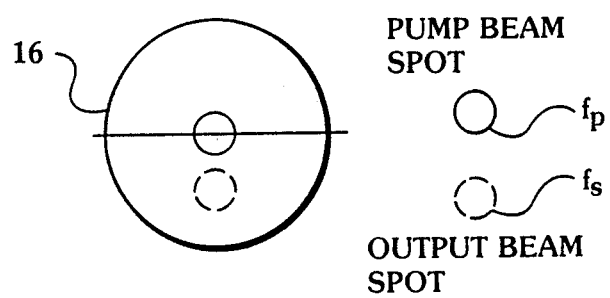

Referring now to the drawing Figures, separate input light beams comprising a strong pump light beam $f_p$ and a very weak signal $f_s$ of an unknown value. These optic signals which are phased matched and have different frequencies are directed through a nonlinear crystal 10 of the type silver thiosulphate manufactured by Cleveland Crystals or any equivalent thereto. The nonlinear crystal combines the strong and weak optic signal generating a combined output signal beam $f_o$ ($f_o=f_p+f_s$). The output beam is then caused to propagate through an interference filter 12 of the type well known in the art. For example, an interference filter with the part number 03 FII XXX (where XXX is the number designating the center frequency at $f_o$) available from Melles Griot. The filter 12 passes the output beam $f_o$ with little or no attenuation while strongly attenuating the strong pump beam $f_p$. The residual pump beam $f_p$ and the output beam $f_o$ are then separated by prism 14 or an equivalent optical device such as a grating. The optical system is aligned so that when the separated beams exit the prism 14 the residual pump beam $f_p$ is focused on the center of a bi-cell photodetector by focusing lens 15 and the beam $f_o$ is directed to one of the cells of the detector bi-cell. The bi-cell 16 is a type EG & G Photon Devices model UV-1402 or an equivalent thereto.

OPERATION OF THE DEVICE OF THE INVENTION

The outputs of the detector bi-cell are electrically balanced and subtracted to produce a minimum output signal when the beam $f_o$ is absent. The input beam $f_o$ is then turned on wherein the difference in the outputs of the two half of the detector bi-cell is an indication of the intensity of weak optic beam $f_s$.

The electronic instruments for performing the balancing of the two bi-cell halves and measuring the electrical level difference between the output of the two bi-cell halves are well known in the electronic art where this invention is directed. Lock-in amplifiers, Models 5361 or 5202, manufactured by EG&G Princeton Applied Research could be used.

Obviously, many modifications and variations of the present invention are possible in light of the above teaching. It is therefore to be understood that, within the scope of the appended claims, the invention may be practiced otherwise than as specifically described.

What is claimed is:

1. A high efficiency combined optic and electrical device for detecting the strength of a very weak optic signal in the presence of a strong pumping optic signal of a slightly different frequency comprising:
   a first optic means for generating an output signal including both said very weak and very strong optic signals;
   a second optic means for greatly attenuating said very strong optic signal while passing said very weak optic signal with minimum attenuation;
   a third optic means for separating said very weak optic signal from the remaining very strong optic signal;
   a fourth optic means for focusing the optic output signals from said third optic means; and
   a pair of optic to electrical converting means, said first, second, third and fourth optic means being positioned so that each of said substantially equal intensity optic signals are directed to a separate one of said optic to electrical converting means and said very weak optic signal is direct to only one of said optic to electrical converting means.

2. The invention as defined in claim 1 wherein said first optic means comprises a nonlinear crystal.

3. The invention as defined in claim 1 wherein said second optic means comprises a filter.

4. The invention as defined in claim 1 wherein said third optic means comprises a prism.

5. The invention as defined in claim 1 wherein said fourth optic means comprises a focusing lens.

6. The invention as defined in claim 1 wherein said optic to electrical converting means is a bi-cell photodetector.

7. A high sensitivity method for detecting the value of a very weak optic signal being pumped by an in phase very high value optic signal comprising the steps of:
   passing the two optic signals through a nonlinear crystal where a combined output optic signal is produced;
   passing the combined optic signal through a filter wherein the very strong optic signal is greatly attenuated to a residual signal and said very weak signal is substantially unaffected;
   passing said residual very strong optic signal and said very weak optic signal through a prism wherein said beams are separated into beams propagating in different directions;
   directing said very strong optic signal to the center of a bi-cell optic signal to electrical signal converter and said very weak optic signal to one side of said optic signal to electrical signal converters; and
   sensing the difference in strength of the outputs of said two optic signal to electrical signal converters, said difference being the value of said very weak optic signal.

* * * * *